(12) United States Patent
Villar Colquell

(10) Patent No.: US 7,753,068 B2
(45) Date of Patent: Jul. 13, 2010

(54) DIVERSION UNDER LOAD CONDITIONS IN DISTRIBUTION SYSTEMS

(76) Inventor: D. Francisco Javier Villar Colquell, C/Manolo Taberner, 25 bajo., Valencia (ES) 46018

( * ) Notice: Subject to any disclaimer, the term of this patent is extended or adjusted under 35 U.S.C. 154(b) by 177 days.

(21) Appl. No.: 11/989,275

(22) PCT Filed: Jul. 28, 2006

(86) PCT No.: PCT/ES2006/070120
§ 371 (c)(1),
(2), (4) Date: Jan. 23, 2008

(87) PCT Pub. No.: WO2007/014976
PCT Pub. Date: Feb. 8, 2007

(65) Prior Publication Data
US 2009/0139579 A1    Jun. 4, 2009

(30) Foreign Application Priority Data
Jul. 29, 2005   (ES) .............................. 200501885

(51) Int. Cl.
*F16L 41/04* (2006.01)
*F16L 47/34* (2006.01)
(52) U.S. Cl. ............... 137/15.14; 137/317; 137/318
(58) Field of Classification Search ............... 137/318, 137/317, 15.14; 285/197
See application file for complete search history.

(56) References Cited

U.S. PATENT DOCUMENTS

| | | | |
|---|---|---|---|
| 3,870,064 A | 3/1975 | Vigneron | 137/15 |
| 4,177,827 A | 12/1979 | Smith et al. | 137/318 |
| 5,105,844 A | 4/1992 | King, Sr. | 137/15 |
| 5,269,340 A * | 12/1993 | Drzewiecki | 137/318 |
| 5,577,528 A * | 11/1996 | Saha et al. | 137/318 |

FOREIGN PATENT DOCUMENTS

| | | |
|---|---|---|
| ES | 411773 | 1/1976 |
| GB | 2 369 662 | 6/2002 |

* cited by examiner

*Primary Examiner*—Kevin L Lee
(74) *Attorney, Agent, or Firm*—Defillo & Associates, Inc; Evelyn A. Defillo

(57) ABSTRACT

The invention relates to a diversion which can be used under load conditions in a fluid distribution system without interrupting the fluid supply or installing a by pass. The diversions consists of a body that is formed by two complementary components including an upper component comprising openings which are oriented transversely to the direction of the pipe to be cut off, which are equipped with seals and which are designed such as to enable the insertion and passage of a cutting blade that is associated with an external guillotine. The aforementioned upper component comprises an inner collar or flange which can be coupled and secured to the pipe segment to be cut off, said collar or flange being joined to a threaded longitudinal element which extends externally and which is used to remove the cut-off pipe segment. The invention also includes elements for sealing the openings once the cutting operations have been performed and the guillotine has been removed.

4 Claims, 5 Drawing Sheets

DIVERSION UNDER LOAD CONDITIONS IN DISTRIBUTION SYSTEMS

This application is a national stage entry of PCT/ES2006/070120 filed Jul. 28, 2006, under the International Convention claiming priority over Spanish Application No. P200501885 filed Jul. 29, 2005.

FIELD OF THE INVENTION

The invention relates to a tap carried out in fluid distribution networks whereby the supply is assured during the placement operation without needing to place any bypass.

OBJECT OF THE INVENTION

The object of the invention consists of obtaining, in an existing fluid transport network, a tap which can inserted without needing to cut off the supply or install a bypass, minimizing the number of fixtures, the weldings and the execution time by means of a simple tap allowing an efficient and safe intervention. The invention is aimed at the industrial pipeline sector.

BACKGROUND AND SUMMARY OF THE INVENTION

As a reference to the current state of the art, under-pressure tapping is currently carried out through a drilling tool located inside the fixture which is fixed to the pipe, as is described for example in the document of utility model number U-142,878 the holder of which is Sociedad Anonima de Industrias Plasticas, with which a hole is made by means of a screw-cutter which is in turn responsible for carrying out tightness.

Other solutions are known in the state of the art, some of which are included below. Thus, Spanish utility model number ES-1 010 938 U, the holder of which is the company Catalana de Gas, S.A., relates to a device incorporating a valve for interrupting the passage of gas as an improvement in the application of the previous taps.

Spanish utility model number ES-1 045 702 U, the holder of which is the company Productos Auxiliares de Instalaciones, S.A., in turn describes a tap combining a drilling element with a flat bar acting as a hot cutter.

Invention patent number P-411,773, the holder of which is the company Pont-a-Mousson, also describes a process using a screwed connector the tightness of which is not carried out on the thread, but rather on the placement of a tightness device.

Finally, invention patent number P-200301979, the holder of which is the same inventor of the present invention, describes a tapping system using two guillotines confined inside a tight chamber that has been previously placed in the network to be tapped, these blades remaining inside the tap.

SUMMARY OF THE INVENTION

Compared to the last mentioned document, the present invention provides the novel particularity of using a single guillotine whereby the cuts for sectioning the pipe are made, having the advantage that the guillotine is outside the tap, the guillotine thus being able to be constructed in a more solid manner and be re-used as many times as necessary. This feature allows simplifying the work to be carried out to a great extent, while at the same time that the size and the cost of the tap or hot tap decrease as the number of parts used is significantly reduced. The size reduction of the tap also benefits the civil labor required, given the lower need to open and adapt the ditch and the subsequent repositioning. The mechanical labor part is also simplified with respect to other known taps, given that the tap of the present invention can be installed more simply and does not require complex tools. This simplicity constitutes a safety assurance, minimizing the risk of leaks, which is an especially important piece of data in the case of natural gas pipelines. The cutting guillotine in turn penetrates the tap through elongated openings designed for that purpose, arranged in a direction perpendicular to the generatrix of the pipe with the consequent sealing gaskets, such that in order to close these openings, according to a first embodiment, sliding lids facilitating the sealing of the tightness retainer with greater safety have been designed, whereas in an alternative version, the tap has recessed portions surrounding each respective opening for the passage of the cutting guillotine, which portions are designed and sized so as to allow housing the closing plates provided with sealing gaskets ensuring the tightness of the joint, and which are fixed in their position with the aid of screws or the like. In both versions, the configurations adopted by the tightness lids have the advantage, compared to conventional stoppers, of being contained in a plane perpendicular to the emission of fluid, facilitating their closing, whereas in the case of using a stopper, the latter must always overcome the pressure of the emanated fluid, which makes its placement difficult, this being an especially significant piece of data in medium and high-pressure networks, and forming a potential risk.

The tap provided by the present invention has been designed for its installation in pipes made of composite, plastic material or the like, such that once it has been assembled on the pipe, a tight enclosure is provided between the parts of the tap body and the contour of the tube in which the tapping is to be carried out. The tightness can be achieved with the use of conventional techniques depending on each material, either by means of elastic gaskets, gluing or heat-sealing by electrowelding. This form of construction provided by the invention provides an important improvement as regards the performance of these tasks, given the operational simplicity provided by it and the absence of complex tools for carrying it out, with the additional advantage that the guillotine used for cutting is not inside the tap, but on the contrary, it forms an external tool which can be re-used. As mentioned above, the guillotine, as a cutting element, accesses from the outside openings for the passage formed for that purpose in suitable positions, cutting by means of its movement perpendicular to the pipeline in the two positions opposing said openings, and thus allowing the separation of a pipe portion in the site of the tap. As will be understood, the openings for the passage of the guillotine are provided with conventional sealing gaskets.

The separation of the cut pipe portion is carried out with the aid of a collar or flange which is fixed to said pipe portion before forming the tap, and which is made integral with the mentioned pipe portion by means of any mechanical operation, by adhesion or by means of heat-sealing, this flange or collar element having a screw mechanism or the like which allows acting on said element for the purpose of removing the pipe portion once it has been cut, said portion remaining housed after the cut inside the tap and joined or retained to the flange or collar element.

The circulation of the fluid is in turn permanently ensured according to the invention due to the exclusive design with which the guillotine has been designed. For the mentioned purpose, the latter has through holes made on its surface, such that at the time of the cut, they allow the passage of the fluid, ensuring the upstream supply and without needing to place any bypass.

BRIEF DESCRIPTION OF THE DRAWINGS

The description of the embodiments of the invention will be better understood with the aid of the attached drawings, in which the following has been shown by way of a non-limiting illustration.

DESCRIPTION OF A PREFERRED EMBODIMENT

The preferred embodiments of the hot tap for fluid distribution networks proposed by the invention will be described below, the graphic depictions shown in the attached drawings being considered as the reference basis. At this point, the clarifying comment must be made that, according to that mentioned above, the invention has been designed for its preferred use in conduits formed by polyethylene pipes, but this must not be considered as limiting, because its essence is also applicable to pipes constructed with other types of materials, with the use of techniques for joining by gluing, sealing gasket, or appropriate in each case. When the pipes are made of polyethylene, joining by electrofusion is preferred.

Figure 1:
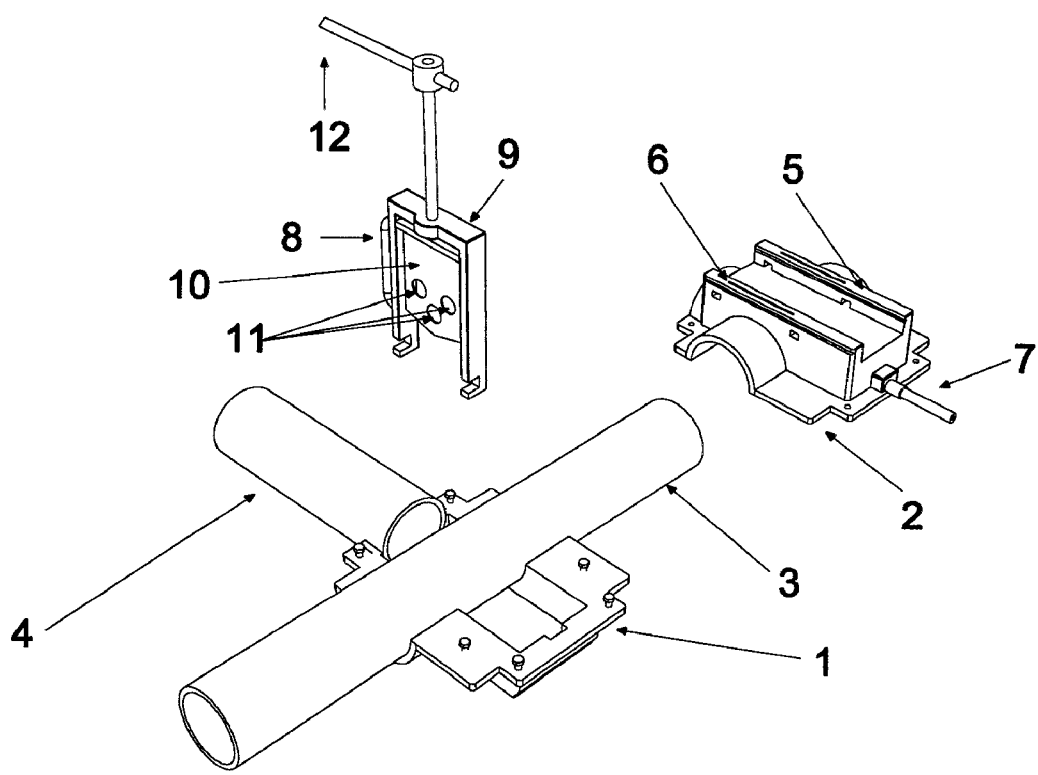
FIG. 1 is a view schematically showing the elements involved in forming the tap, together with the external cutting guillotine.

As can be seen in FIG. 1, the tap comprises two main components 1, 2, configured to be complementarily coupled in the chosen position around a pipe 3 in which a tap is to be carried out, further having an inlet for the incorporation of a second pipe with reference number 4 and forming the tapping element. The component 2 of the tap body includes respective openings 5, 6 made in raised portions projecting with respect to the plane of said component 2 of the tap, in positions oriented transversely with respect to the main pipe 3; said component further incorporates a threaded longitudinal element, such as the one with reference number 7 in the figure, which element accesses the outside from a position opposite to the mentioned pipe 4. The tool used for cutting consists of a guillotine generally indicated with reference number 8, including a frame 9 prepared for its support on the component 2 of the tap body, in a position opposing any of the mentioned openings 5, 6, said frame 9 being open at the lower part to allow the passage of a cutting blade 10 which can slide therealong and which is actuated from the outside by means of a crank 12. The surface of the cutting blade 10 has through holes 11 in predetermined positions thereof.

Figure 2:
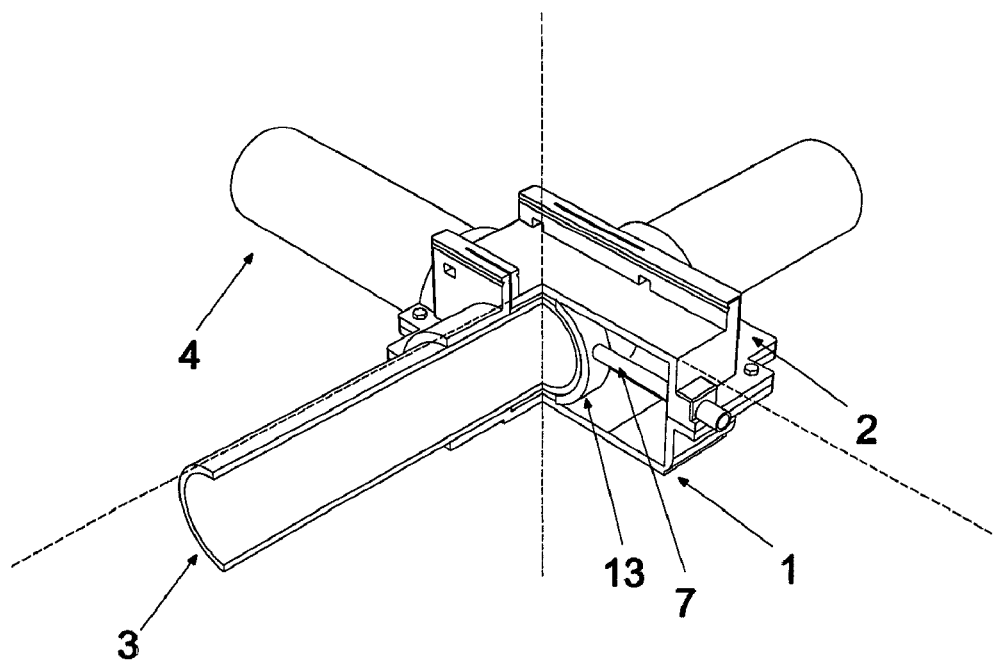
FIG. 2 is a schematic view of the elements forming the tap coupled to one another, in which a cut has been made to facilitate its comprehension.

With reference now to FIG. 2, it can be seen that both components 1, 2 of the tap body shown in FIG. 1 are already coupled to one another and prepared for the next sequence. FIG. 2 shows the lower 2 and upper 2 components open, for the purpose of showing the joint between a flange or collar 13 which is linked to the inner end of the threaded longitudinal element 7, directly applied on the pipe portion which is to be cut, with which it is made integral, as mentioned above, by means of adhesion or with any known common technique.

Figure 3:
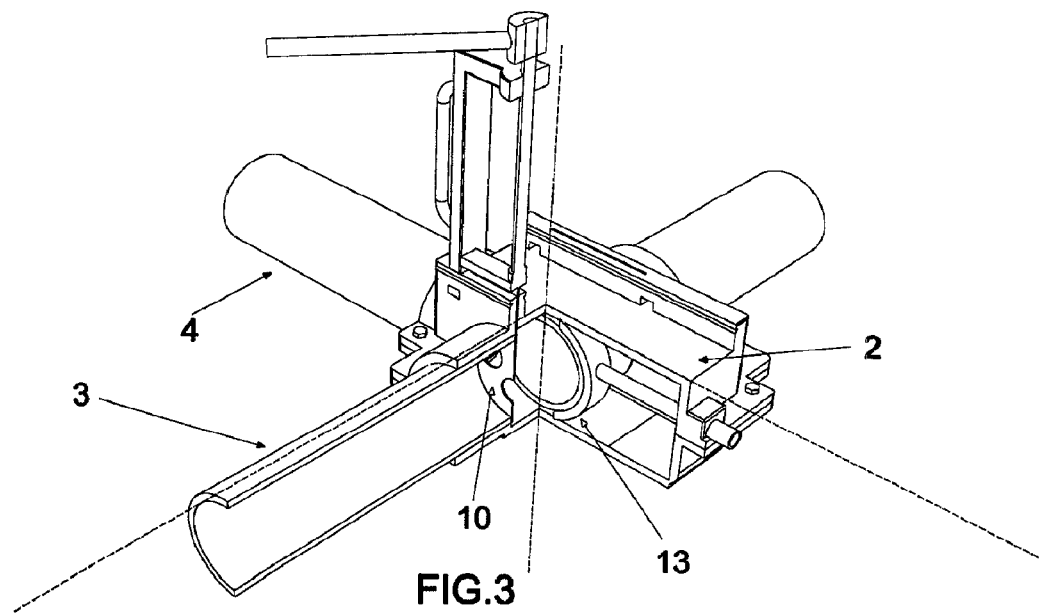
FIG. 3 is a depiction similar to that of FIG. 2, with the guillotine in an operational position.

If the depiction of FIG. 3 is observed, a new sequence of the cutting process can be seen, in which said cutting tool or guillotine 8 is already at the component 2 of the tap body, with its blade 10 cutting through an opening, corresponding in this case to opening 6. The blade is partially inserted inside the pipe 3, such that the passage of the fluid is not cut off at any time due to the fact that as the cutting movement progresses, the holes 11 of the blade enter inside the pipe and thus assure the passage of the fluid therethrough.

Figure 4:
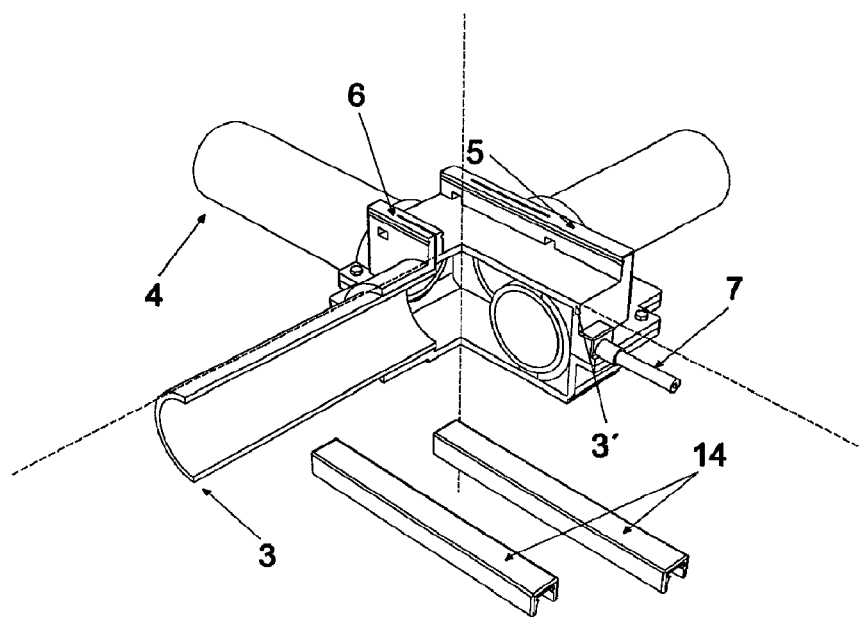
FIG. 4 is an open view of the tap to show the removal and separation of the pipe portion which has been cut with the guillotine with respect to the rest of the pipeline, the slide elements for sealing the openings for the passage of the guillotine further being visible.

Once the first cut has been made through one of the openings (through opening 6, for example), the second cut is made through the other opening (through opening 5, for example), whereby a pipe portion 3' is loose with respect to the original pipe 3, and ready to be removed from the position it was occupying. This situation is shown in FIG. 4, in which the pipe portion 3' is shown misaligned with the rest of the original pipe, as a result of the action carried out by means of the threaded longitudinal element 7. That section is therefore open in the original pipe, thus allowing the access of the fluid towards the other pipe 4, and thus forming the desired tap. After the operating of cutting the pipe 3 and removing the cut portion 3' has ended, the openings 5, 6 through which the cut was made are closed, and to that end, according to a first embodiment, the invention has provided the use of sealing elements 14 designed and sized to be coupled to the raised portions in which such openings have been formed, by sliding on said raised portions, and being able to be fixed in their position by means of applying any electrofusion technique or the like. The portion of the threaded longitudinal element 7 projecting outside the tap thus obtained is subsequently cut.

Figure 5:
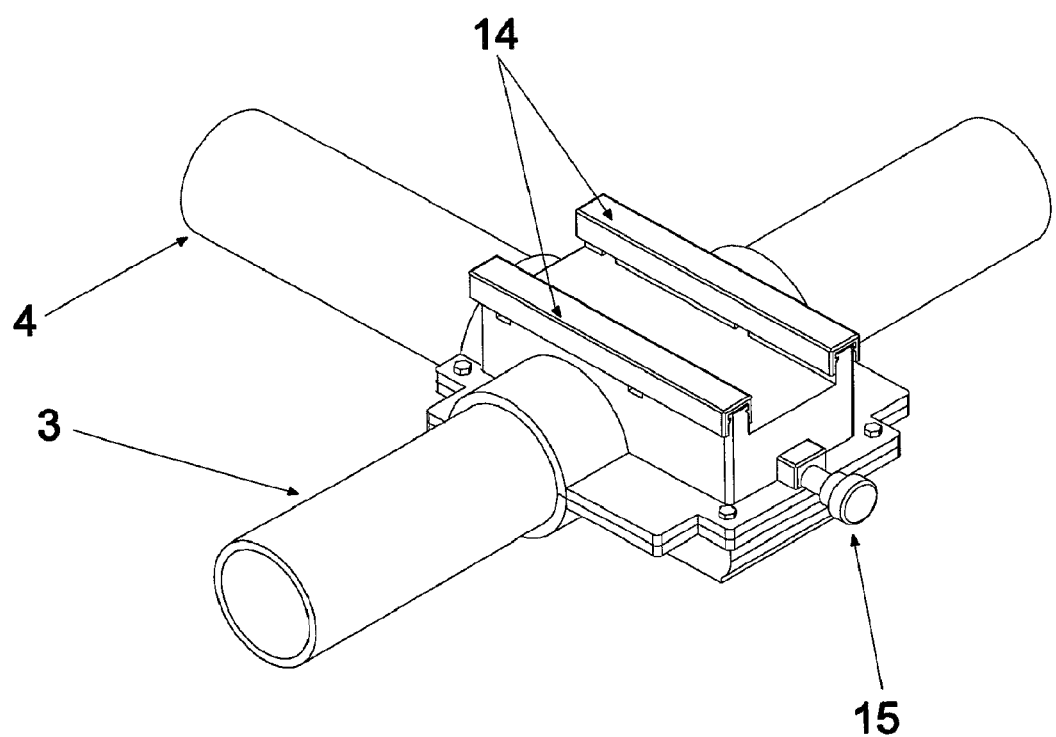
FIG. 5 is a schematic depiction of a tap carried out according to the invention, in which said tightness slides are placed in their respective positions.

This situation is shown in FIG. 5, in which the slide elements 14 for sealing the openings are located in their correct position, and the excess section of the threaded longitudinal element has been cut, its end now being concealed by the application of an external stopper indicated with reference number 15, and aiding, together with the tightness provided by the thread of the longitudinal element 7 itself, to maintain the sealing of this through hole.

However, the invention has provided that the component 2 of the tap assembly which can be machined such that the openings for the passage of the cutting blade 10 of the guillotine element 8 are formed inside the slightly depressed areas, i.e. recessed surface areas, with the same orientations and features that have already been described above, but with the particularity that, in a modified version of this type, tight closing elements for the grooves can be used, which elements are fixed in their position with the aid of screws, and which together form an absolutely reliable, easy-to-assemble sealing means. This modified embodiment has been shown in FIG. 6 of the drawings, in which the component 2' of the tap body has recessed areas 16 on its surface, with predetermined dimensions, in positions equivalent to the elevations of the component 2 shown in FIG. 1, and with the inclusion of at least one threaded hole 17 at each end. This arrangement is complementary to the design of a closing plate shown in FIG. 7, indicated by means of reference number 18, configured and sized according to each recessed area 16 and provided on the inner face with a recess 19 following an approximately rectangular oblong path to leave an inner gap between parallel sides which, in the operational position, will oppose the opening 5, 6 on which it is applied, such that the latter will be surrounded by an O-ring seal 20 prepared for its coupling inside the mentioned recess 19. The plate 18 further includes a through hole 21 close to each of its respective ends, in positions which can oppose threaded holes 17 made in the component 2' of the tap body.

Figure 6:
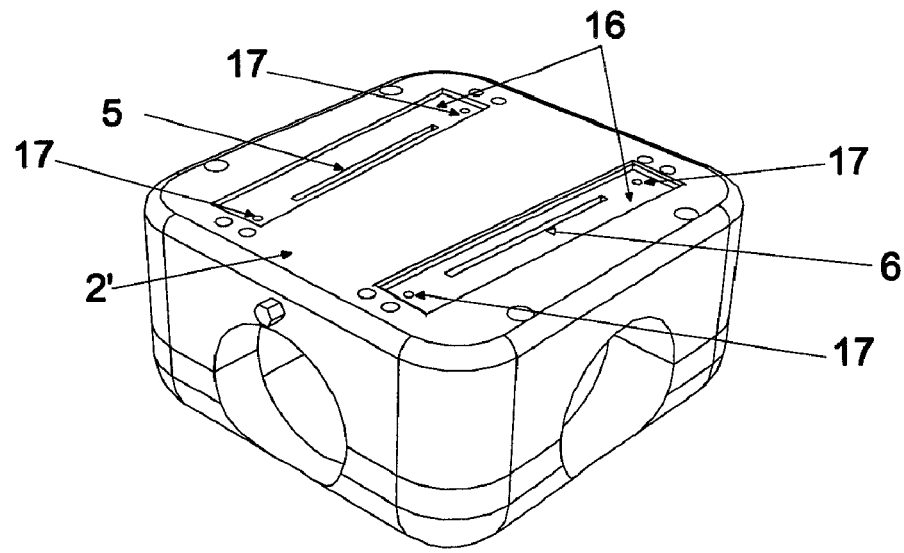
FIG. 6 is a view of a machined body for hot tapping according to an alternative version to that shown in the previous figures.
Figure 7:
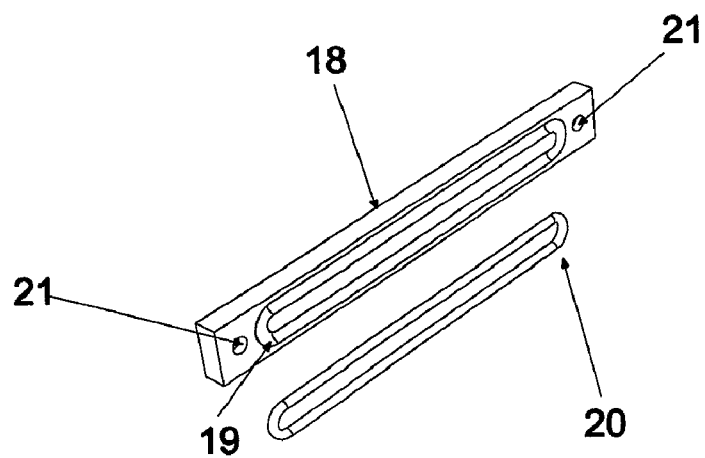
FIG. 7 is a schematic depiction of a tightness and closing plate used together with the tap body of FIG. 6, and Finally.
Figure 8:
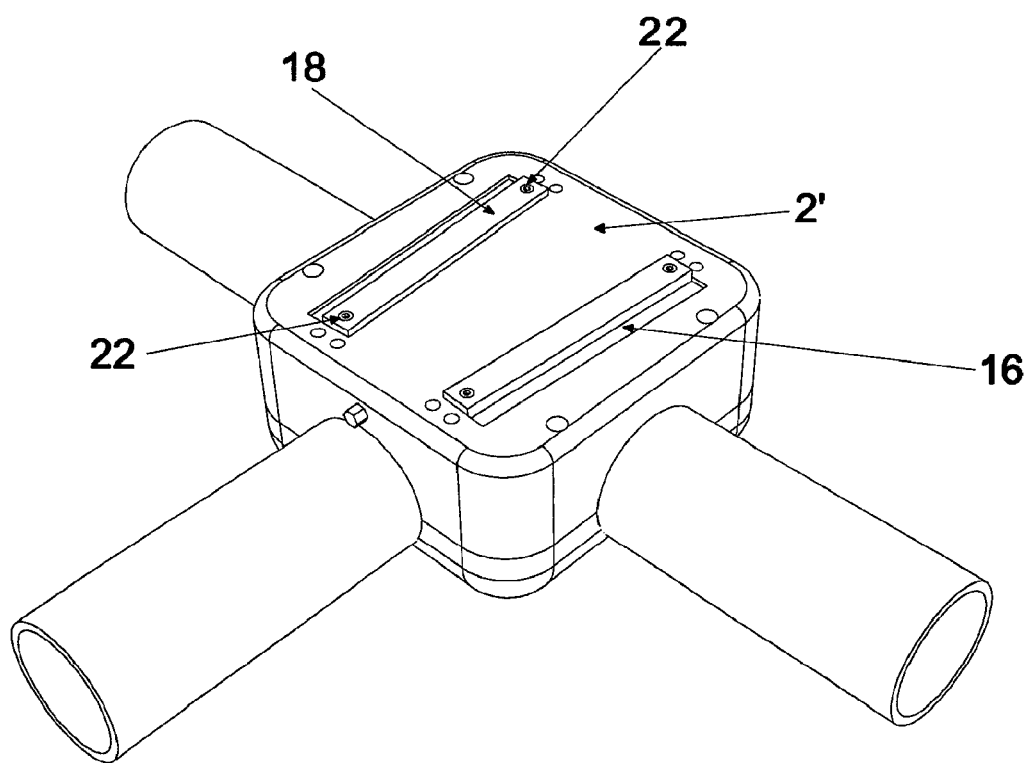
FIG. 8 is an external view of the tap obtained based on the elements of FIGS. 6 and 7.

With an embodiment of the elements such as those shown in FIGS. 6 and 7, a sealing of the openings 5, 6 assuring the tightness against the fluid through said openings is possible. This situation is shown in FIG. 8, in which a closing plate 18 is already applied to each of the respective recessed areas 16 on the surface of the component 2', with the placement of the sealing gasket 20 (not visible in the figure), and with the fixing of each plate in its corresponding position by means of using screws 22 passing through the holes 21 of the sealing plates, and which are finally made integral with the respective threaded hole 17.

As will be understood, both versions provide effective sealing solutions, and can be chosen indistinctly according to the application or the needs or convenience of each particular case.

The invention claimed is:

1. A hot tap in distribution networks, particularly in fluid distribution networks, the hot tap using a cutting tool for cutting a portion of a pipe (3) for the formation of the hot tap, maintaining the service at all times and without needing to place a bypass, comprising:
   a single external guillotine as the cutting tool actuated from outside the hot tap and provided with a moveable blade penetrating inside a tap body through openings made for that purpose in the corresponding component of the hot tap body, such openings being arranged transversely to the direction of said pipe which is to be cut and having sealing gaskets, the movable blade having holes distributed over its surface for assuring the passage of the fluid during the cut, and the component of the hot tap body further having an inner flange or collar coupled and fixed on the pipe portion which is to be cut, said flange or collar being able to be moved by means of a longitudinal threaded element for removing the pipe portion once it has been cut, and separating said pipe portion from the position occupied in the pipe.

2. A hot tap according to claim 1, wherein the openings for the passage of the guillotine are formed in projecting portions with respect to the surface plane of the component of the hot tap body, the projecting portions being configured to allow the application of slide elements by the movement of said slide element on said projecting portions for tight seal openings once the tapping has ended.

3. A hot tap according to claim 1, wherein the component of the hot tap body is machined such that the openings are included in recessed surface portions, the recessed portions being provided with the incorporation of a threaded hole next to each of their respective ends, and allow the incorporation of correspondingly sized plates, provided with a surface recess which is developed according to a closed path and which has been sized to allow therein the incorporation of a sealing gasket, said plate further including the formation of a through hole facing said threaded holes of said component, and this assembly of plate and O-ring seal being able to be positioned inside each recessed area for the purpose of the closing and tightness of the corresponding opening as a result of the placement of the corresponding gasket.

4. A process for installing a hot tap for fluid distribution networks according to claim 1, comprising the following steps:
   fixing the hot tap to the pipe in service by means of screws, flanges or conventional fixing elements;
   fixing the collar or flange element which will subsequently allow removing the cut section;
   carrying out the tightness of the assembly;
   positioning the cutting element in place, and cutting the existing network pipe;
   removing the cutting element from the tap body;
   withdrawing or separating the cut tube portion; and
   sealing the openings for the passage of the blade of the guillotine used for cutting.

\* \* \* \* \*

UNITED STATES PATENT AND TRADEMARK OFFICE
CERTIFICATE OF CORRECTION

| | | |
|---|---|---|
| PATENT NO. | : 7,753,068 B2 | Page 1 of 1 |
| APPLICATION NO. | : 11/989275 | |
| DATED | : July 13, 2010 | |
| INVENTOR(S) | : Francisco Javier Villar Cloquell | |

It is certified that error appears in the above-identified patent and that said Letters Patent is hereby corrected as shown below:

Title Page; should read;

(76) Inventor:  D. Francisco Javier Villar Cloquell
C/ Manolo Taberner, 25 Bajo
Valencia, (ES) 46018

Signed and Sealed this

Twenty-eighth Day of September, 2010

David J. Kappos
*Director of the United States Patent and Trademark Office*